United States Patent [19]

Brittain et al.

[11] Patent Number: 5,653,271

[45] Date of Patent: Aug. 5, 1997

[54] OIL AND OIL FILTER COLLECTION AND RECYCLE APPARATUS

[76] Inventors: Charles Brittain, 8414 San Fernando Rd., Sun Valley, Calif. 91352; Gilbert B. Ross, 17640 Vincennes St., Northridge, Calif. 91325

[21] Appl. No.: 558,592

[22] Filed: Oct. 30, 1995

Related U.S. Application Data

[63] Continuation-in-part of Ser. No. 409,377, Mar. 23, 1995.

[51] Int. Cl.$^6$ ..................................................... B67C 9/00
[52] U.S. Cl. ........................... 141/98; 141/106; 141/364; 184/106; 220/571.1; 220/572; 220/573
[58] Field of Search ........................ 141/98, 106, 319, 141/320, 322, 364, 375; 220/254, 306, 308, 571–573; 184/106; 137/312

[56] References Cited

U.S. PATENT DOCUMENTS

| | | | |
|---|---|---|---|
| 381,253 | 4/1888 | Kinports | 220/571 |
| 505,208 | 9/1893 | Wagandt | 141/364 X |
| 2,086,936 | 7/1937 | Elsy et al. | 141/364 |
| 2,199,970 | 5/1940 | Mitchell | 141/98 |
| 2,717,660 | 9/1955 | Reisert et al. | 184/1.5 |
| 2,989,208 | 6/1961 | Gibbs, Jr. | 220/254 |
| 3,810,487 | 5/1974 | Cable et al. | 137/351 |
| 3,927,701 | 12/1975 | Lederer | 141/98 |
| 4,114,660 | 9/1978 | Arruda | 141/98 |
| 4,823,947 | 4/1989 | Maynard, Jr. | 141/98 X |
| 4,974,647 | 12/1990 | Eastom | 141/98 |
| 5,033,520 | 7/1991 | Kuemichel | 141/231 |
| 5,033,637 | 7/1991 | Webb | 220/571 X |
| 5,172,739 | 12/1992 | Ristroph | 141/98 |
| 5,190,085 | 3/1993 | Dietzen | 141/98 |
| 5,211,289 | 5/1993 | Matthews | 220/254 X |
| 5,291,921 | 3/1994 | Devine | 141/106 X |
| 5,328,047 | 7/1994 | Smith | 220/306 X |
| 5,415,210 | 5/1995 | Hannah | 141/98 X |
| 5,460,287 | 10/1995 | Cargile et al. | 220/306 |
| 5,489,042 | 2/1996 | Ewald | 220/573 |

*Primary Examiner*—J. Casimer Jacyna
*Attorney, Agent, or Firm*—Louis J. Bachand

[57] ABSTRACT

An oil and oil filter recycle apparatus useful to consumers who change their own oil comprising the assembly of a receptacle for the oil and oil filter, a support within the receptacle to keep the oil filter from being immersed in dried oil, and a drain unit which is low profile to go under vehicle, invertible to empty its contents into the receptacle for transport to a recycle location, and mated to the receptacle to seal the receptacle and drain unit mutually against leakage while anchoring the support screen in the receptacle inward of the seal.

25 Claims, 4 Drawing Sheets

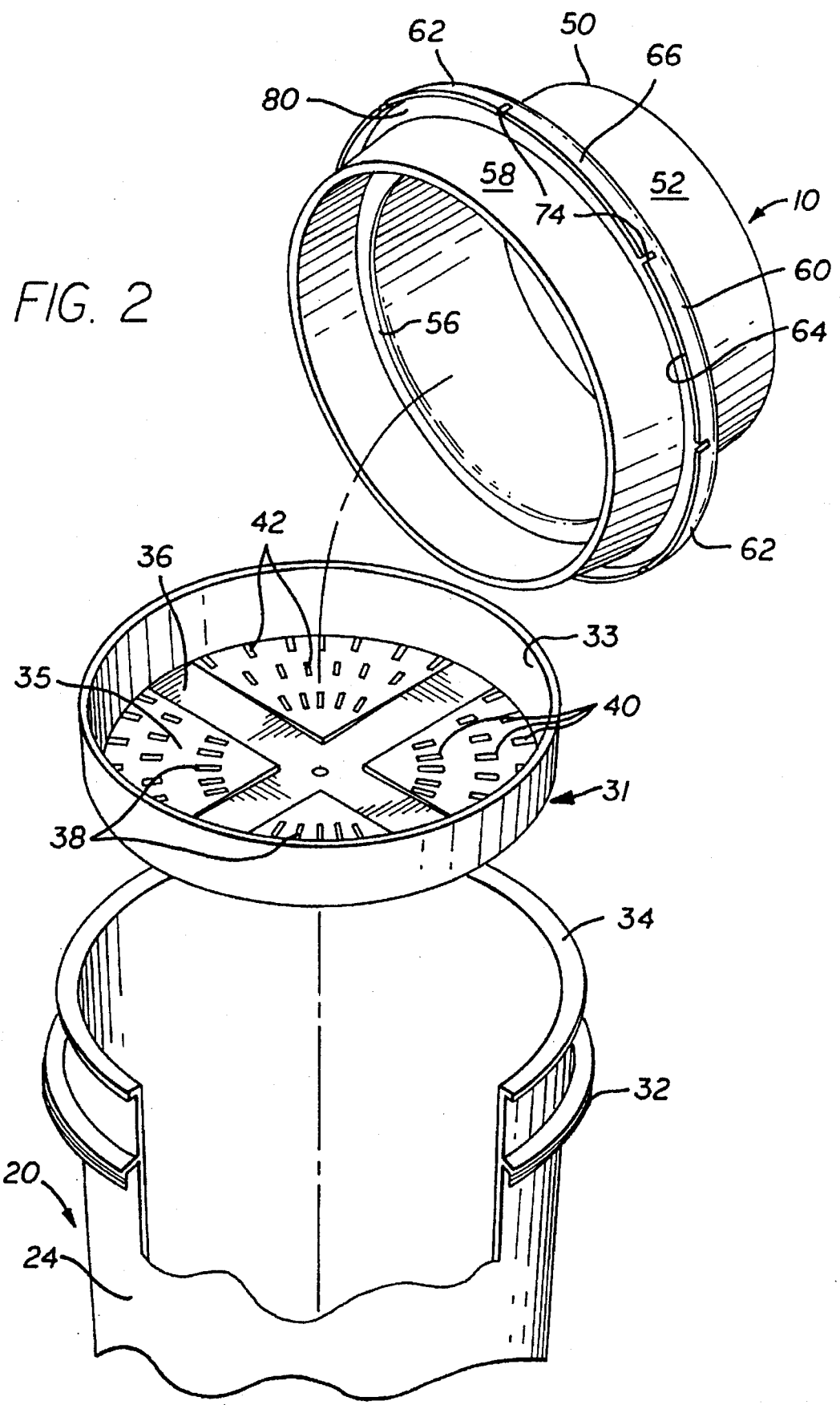

OIL AND OIL FILTER COLLECTION AND RECYCLE APPARATUS

REFERENCE TO RELATED APPLICATION

This application is a continuation in part of copending application Ser. No. 08/409,377, filed Mar. 23, 1995, and still pending, the disclosure of which is incorporated herein by this reference.

TECHNICAL FIELD

This application relates to an environmentally effective, cost efficient, and readily adopted oil and oil filter collection and recycle apparatus. More particularly, the invention has to do with a consumer usable collection apparatus comprising a higher profile receptacle and cooperating lower profile drain and screen units which facilitate the collection of the oil from the automobile oil pan drain port, into the drain unit which is sized to enable ready collection from beneath the automobile. The drain unit is designed to enable the spill-free shifting of the oil to the collection receptacle which is tightly closable for temporary storage of the oil and oil filter and ultimate delivery of oil and oil filter content to a recycle location. The screen unit supports the filter above the oil transferred to the receptacle and enables continued draining of oil from the oil filter after its removal from the automobile. The invention thus provides the optimum in oil recovery combined with the optimum in oil filter recovery for recycling by the consumer with minimum risk of spillage and environmental damage.

BACKGROUND OF THE INVENTION

Disposal of used oil or oil-containing oil filters in landfills, storm drains, or in public and private places not intended as disposal sites is potentially harmful to ground water, the atmosphere, and the flora and fauna in the area, as the used oil will contain in addition to the expected hydrocarbons measurable quantities of heavy metals. Do-it-yourself oil changes are increasing in popularity as auto supply stores provide improved equipment to assist the car owner with expeditious disposal of used oil, and service stations, too, accept the used oil. A typical oil change involves from 4 to 6 quarts of oil and a filter which may contain as much as an additional quart of oil as it is removed from the vehicle. While inventive consumers have used just about everything to catch and transport the used oil, e.g. from buckets to roasting pans, a popular approach has been to use molded plastic containers which receive oil directly from the oil drain port and enclose it until disposal. Purveyors of such devices seem oblivious to the oil filter retrieval and disposal problem as their devices make no allowance for this important by-product of the oil change. While the oil may go to the service station, the oil filter, with no ready means of neat collection and transport, may go to the local landfill.

SUMMARY OF THE INVENTION

It is accordingly an object of the invention to provide an apparatus for the collection and recycle of both motor oil and oil filters from consumers. It is another object to provide such apparatus in which the drain unit is low profile so as to fit under an automobile and upwardly widely open-mouthed sufficiently to receive an oil filter and to easily capture oil being drained from the automobile engine. It is a further object to provide a higher profile receptacle for receiving the contents of the low profile drain unit for temporary storage in a sealed condition against inadvertent loss of oil and for continued draining of the oil filter before ultimate disposal to meet legal standards for transport of used oil filters. It is a further object to provide for closing of the higher profile receptacle and the drain unit simultaneously by having the receptacle and unit registered with one another in opposed relation and fastened together in mutually sealed condition. It is a still further object to provide means for suspending the oil filter above the drained oil for continued draining of the filter during the interim between oil change and oil disposal so that the filters when finally transported are essentially drained of free oil, the oil filter typically being carded on a screen unit supported in fixed relation in the receptacle. Other objects will appear hereinafter.

These and other objects of the invention to become apparent hereinafter are realized in an apparatus for collection of motor vehicle oil and oil filters for recycle, comprising a receptacle having an upward opening of a given diameter, and a drain unit having an upward opening of like diameter to the receptacle opening and adapted to collect oil and oil filters under a motor vehicle in a collection position, the drain unit being bodily invertible to transfer drained oil and the oil filter into the receptacle, the receptacle and drain unit having cooperating structure for securing the receptacle and the drain unit together in mutually closing relation against leakage of oil from the apparatus.

In this and like embodiments, the receptacle is of greater vertical extent than the drain unit and not fittable under a motor vehicle like the drain unit, the receptacle is of greater depth than diameter, the drain unit is of greater diameter than depth, there is further provided a generally U-shaped in cross-section, downwardly open, perimetrical flange surrounding the receptacle opening, the receptacle flange defining the receptacle portion of the cooperating structure for securing the receptacle to the drain unit, there is further provided a generally U-shaped in cross-section, downwardly open, perimetrical flange extending about the drain unit, the drain unit flange typically overfitting the receptacle flange and defining the drain unit portion of the cooperating structure for securing the drain unit to the receptacle, and the drain unit flange defines a circumferentially distributed series of radially disposed tabs, the tabs being adapted to interlock with the receptacle perimetrical flange in securing together the receptacle and the drain unit.

In a more particularly preferred embodiment, the apparatus further includes an oil filter support adapted and arranged to support the oil filter out of contact with drained oil in the receptacle, the oil filter support comprises a screen unit interfitted within the receptacle, the screen defining a perforate wall in spaced relation to drained oil within the receptacle for supporting an oil filter in oil draining relation into the drained oil.

In a further embodiment, the invention comprises an apparatus for collection of motor vehicle oil and oil filters for recycle, comprising a receptacle having an upward opening of a given diameter and a depth greater than the given diameter, an oil filter support within the receptacle, the oil filter support having a vertical extent less than the depth of the receptacle, and a drain unit having an opening of like diameter to the receptacle opening and a depth less than its diameter and sufficient to receive an oil filter standing on end supported by the oil filter support within the apparatus, the drain unit being adapted to collect oil under a motor vehicle in a collection position in which the drain unit is upwardly open, the drain unit being bodily invertible from the collection position to be downwardly open to transfer drained oil into the receptacle, the receptacle and drain unit having mating structures for securing the receptacle and the drain unit together each mutually to close the opening in the other against oil leakage from the apparatus.

In this and like embodiments, the receptacle and drain unit are fabricated of oil resistant plastic, the receptacle comprises a vertically extended generally frusto-conical sidewall, a horizontal bottom wall at the lower end of the sidewall closing the lower end of the receptacle, and at the upper end of the sidewall an opening into the receptacle and a generally U-shaped in cross-section, downwardly open, perimetrical flange surrounding the receptacle opening, the receptacle flange defining the receptacle mating structure for securing the receptacle to said drain unit, the drain unit comprises a vertically extended sidewall, a transverse bottom wall at one end closing the drain unit and an opening at the opposite end, and a generally U-shaped in cross-section, perimetrical flange extending about the drain unit and open in the direction of the drain unit opening, the drain unit flange defining the drain unit mating structure for securing the drain unit to the receptacle, the sidewall has a continued extent beyond the flange surrounding the opening, whereby the sidewall continued extent is inserted into the receptacle in the mated relation of the receptacle and the drain unit flanges, the oil filter support comprises a generally circular perforate wall transversely disposed within the receptacle in predetermined position to support an oil filter in draining position with the receptacle and the drain unit mated, the drain unit sidewall continued extent engaging the oil filter support to maintain the support in its predetermined position, the drain unit sidewall continued extent defines a circular abutment, the abutment engaging the oil filter support peripherally and adjacent the receptacle sidewall, the drain unit flange defines a circumferentially distributed series of inwardly disposed radially oriented tabs adapted and arranged to lock with the receptacle perimetrical flange in securing together the receptacle and the drain unit, the drain unit flange is locally flexible adjacent the tabs for separating the tabs from locking with the receptacle perimetrical flange, the drain unit flange has a circumferential series of kerfs to provide local flexibility to the flange between the kerfs, and the oil filter support comprises a separately formed screen unit having a sidewall and perforate bottom wall, the screen unit sidewall being adapted to be wedged within the receptacle below the open end thereof with its bottom wall transverse to the longitudinal axis of the receptacle, the drain unit extending above the receptacle opening a distance to accommodate height of an oil filter disposed on the screen unit and extending below the receptacle opening a distance to engage the screen unit in wedging relation against the receptacle in the mated condition of the drain unit with the receptacle.

In another embodiment, the invention provides an apparatus for collection of motor vehicle oil and oil filters for recycle, comprising a generally frusto-conical receptacle having a bottom wall, a sidewall and an upward opening of a given diameter and a depth greater than the given diameter, a separately formed oil filter support screen wedged within the receptacle below the opening therein a predetermined distance and above the receptacle bottom wall a distance to keep an oil filter on the support screen above drained oil within the receptacle, a drain unit cooperating with the opening in the receptacle in closing relation, the drain unit having an opening of like diameter to the receptacle opening and a depth less than its diameter and sufficient to receive an oil filter standing on end supported by the oil filter support within the receptacle, the drain unit being adapted to collect oil under a motor vehicle in a collection position in which the drain unit is upwardly open, the drain unit being bodily invertible from the collection position to be downwardly open to transfer drained oil into the receptacle, the receptacle and drain unit having mating structures for securing the receptacle and the drain unit together each mutually to close the opening in the other against oil leakage from the apparatus, the mating structures including a perimetrical flange surrounding the receptacle opening and interfittable therewith in locking relation a perimetrical flange extending about the drain unit intermediate the ends thereof, the drain unit having beyond its flange a continued extent engaged with the support screen to secure the support screen in place when the drain unit is locked to the receptacle.

BRIEF DESCRIPTION OF THE DRAWINGS

The invention will be further described in conjunction with the attached drawings in which:

FIG. 2 is an exploded view of the invention apparatus;

DESCRIPTION OF THE PREFERRED EMBODIMENTS

As will be evident from the above, the invention provides equipment useful to the consumer who wants to change motor vehicle oil at home and which meets all requirements for safety, convenience and environmental security. The receptacle holds one, two or more oil changes and the accompanying filters. It is easily transported like a pail of paint. The receptacle to be thus commodious is too tall to be placed under a motor vehicle to catch draining oil. The invention provides a separable drain unit which does readily fit under a motor vehicle. The drain unit has a wide mouth, unlike some commercial devices which have only narrow mouths that are difficult to direct oil into from a drain port. The wide mouth opening also permits retention of the oil filter. The drain unit is designed to be used to carry oil (and filter, if desired) from under the motor vehicle to the receptacle. There the drain unit is simply inverted and its contents spilled into the receptacle. The wide mouth opening of the receptacle makes this operation simple. Within the receptacle an oil filter support screen catches the filter and permits the drained oil to flow past to the bottom of the receptacle. The oil filter is generally upended so as to continue to drain, out of contact with the drained oil. The drain unit is not left about to pollute the environment. It is fitted to the receptacle for storage and for sealing the receptacle and itself against leakage. The design of the drain unit allows for the upright disposition, and continued draining, of the oil filter on the recessed support screen while closing the receptacle, and drain unit, openings. When convenient, the consumer empties the receptacle at a suitable facility. It is noteworthy that the present invention apparatus collects the oil filters as an integral part of the apparatus usage; these forgotten soldiers of the environmental wars are not ignored, left behind or left unaccounted for. This single improvement over the state of the art oil collection devices alone will save countless additions of oil to the ground at landfills.

Figure 1:
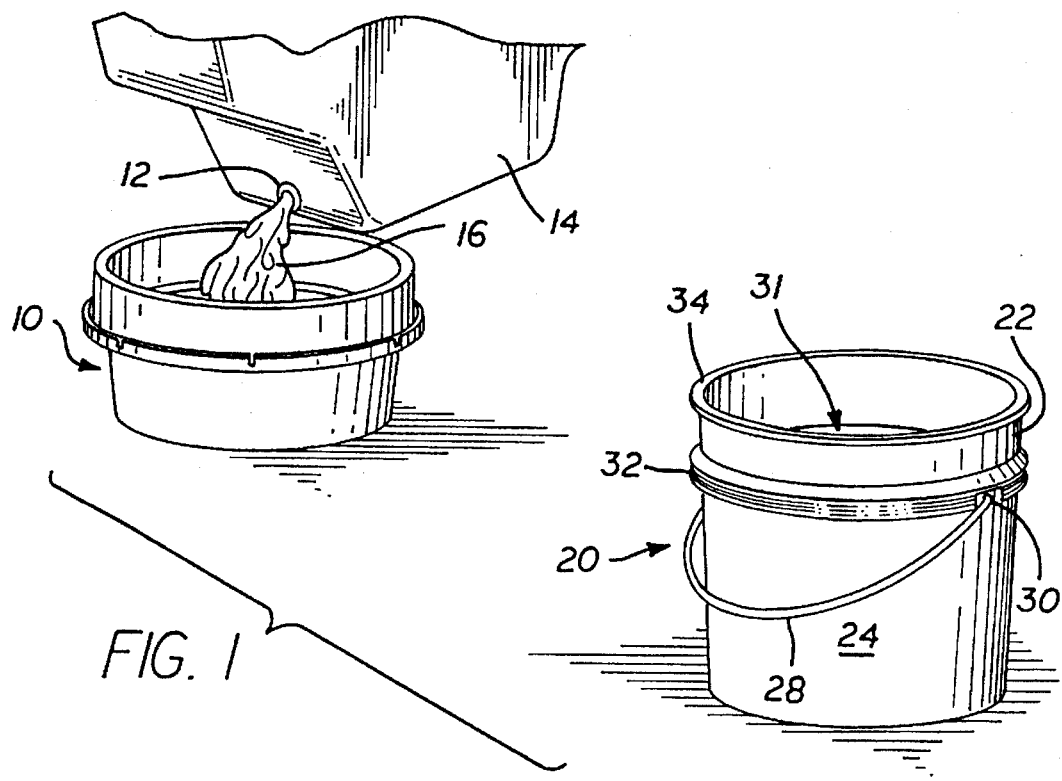
FIG. 1 is an axonometric view of the invention drain unit arranged to collect draining oil.

With reference now to the drawings in detail, in FIG. 1, the apparatus drain unit 10 is seen in its collection position, placed under the oil drain port 12 of the motor vehicle 14 for collection of draining oil 16. The oil filter 18 (FIG. 3) can be contained in the drain unit 10 as well but is not shown. The receptacle 20 is a conventional pail of several gallons capacity, shaped generally as a frusto-conical container 22 having a slightly inward tapered sidewall 24, a transverse bottom wall 26 (FIG. 3), bail 28, and bail ears 30. A circumferential rib 32 surrounds the receptacle to limit damage if the receptacle tips over. Above the rib 32 a perimetrical flange 34 is provided in the form of a generally U-shaped in cross-section, downwardly open structure integral with the receptacle sidewall 24. The specific geometric form of the receptacle 20 and drain unit 10 is not narrowly critical, with any form providing adequate capacity and strength being suitable. Molded oil resistant plastic, or any plastic coated or lined with an oil resistant material may be used in fabricating the drain unit 10 and the receptacle 20.

Figure 3:
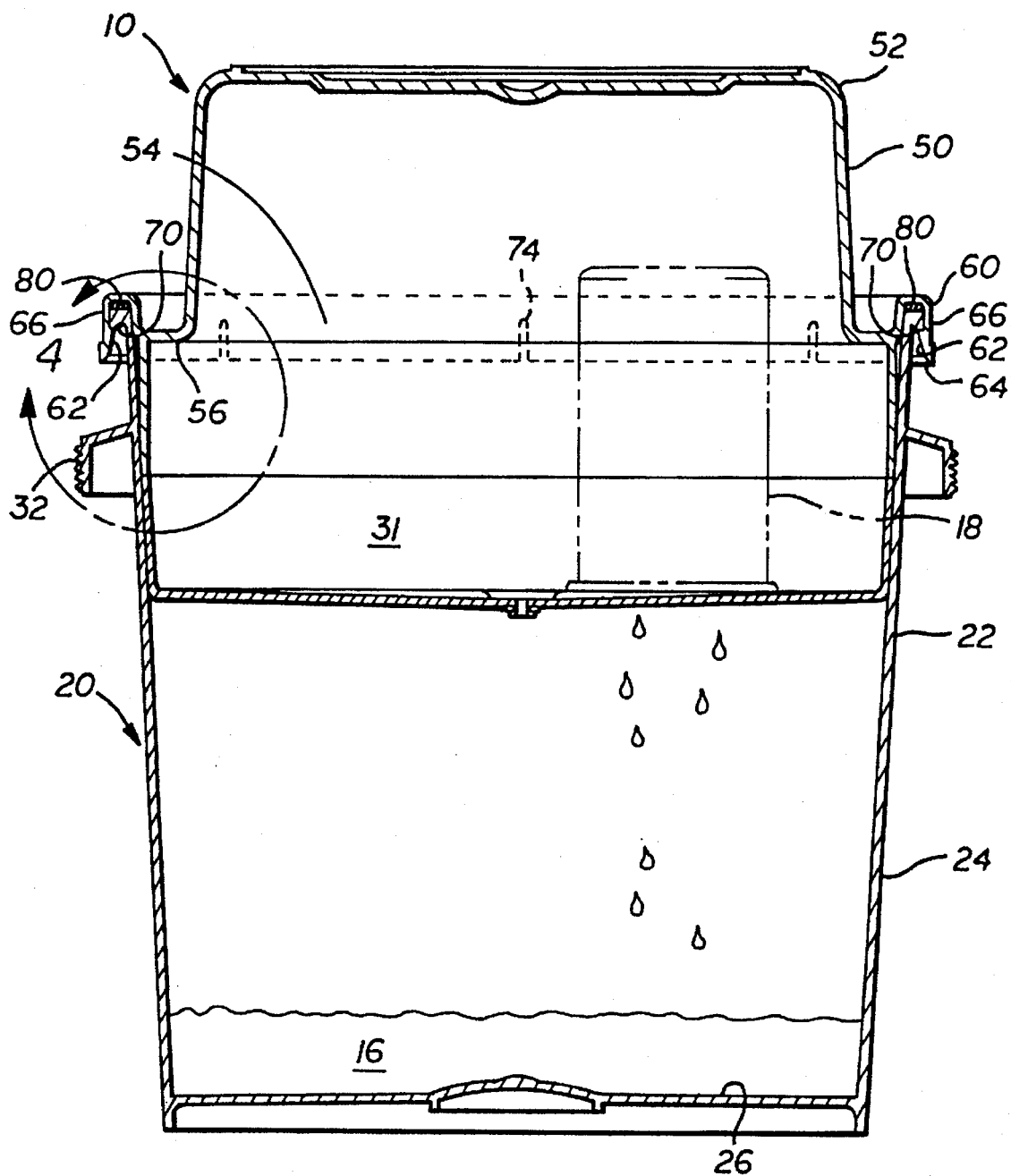
FIG. 3 is a vertical section view of the assembled apparatus.
Figure 4:
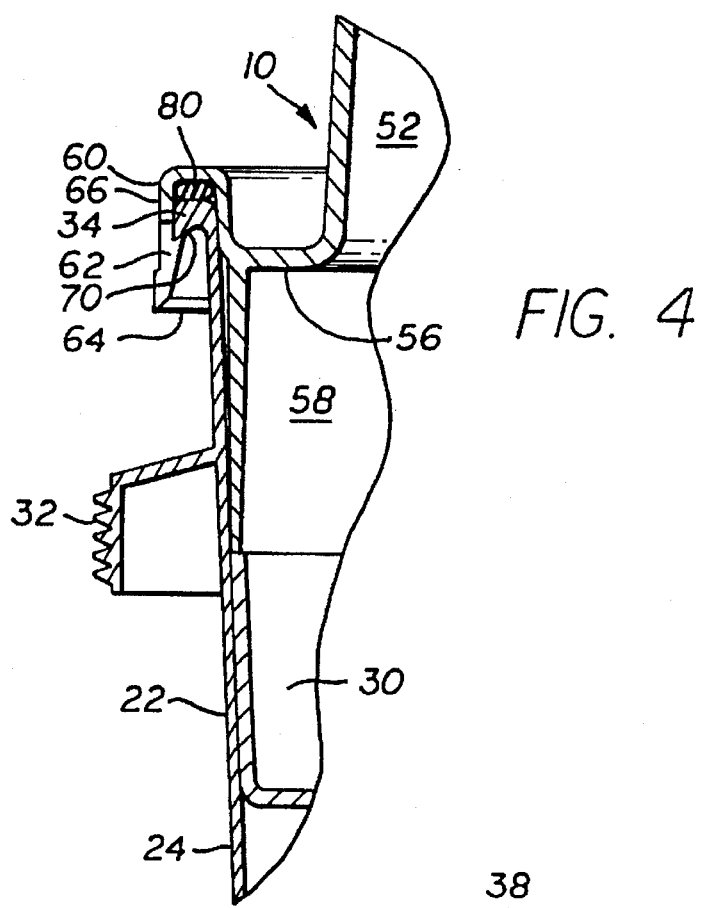
FIG. 4 is a view taken on line 4 in FIG. 3.
Figure 5:
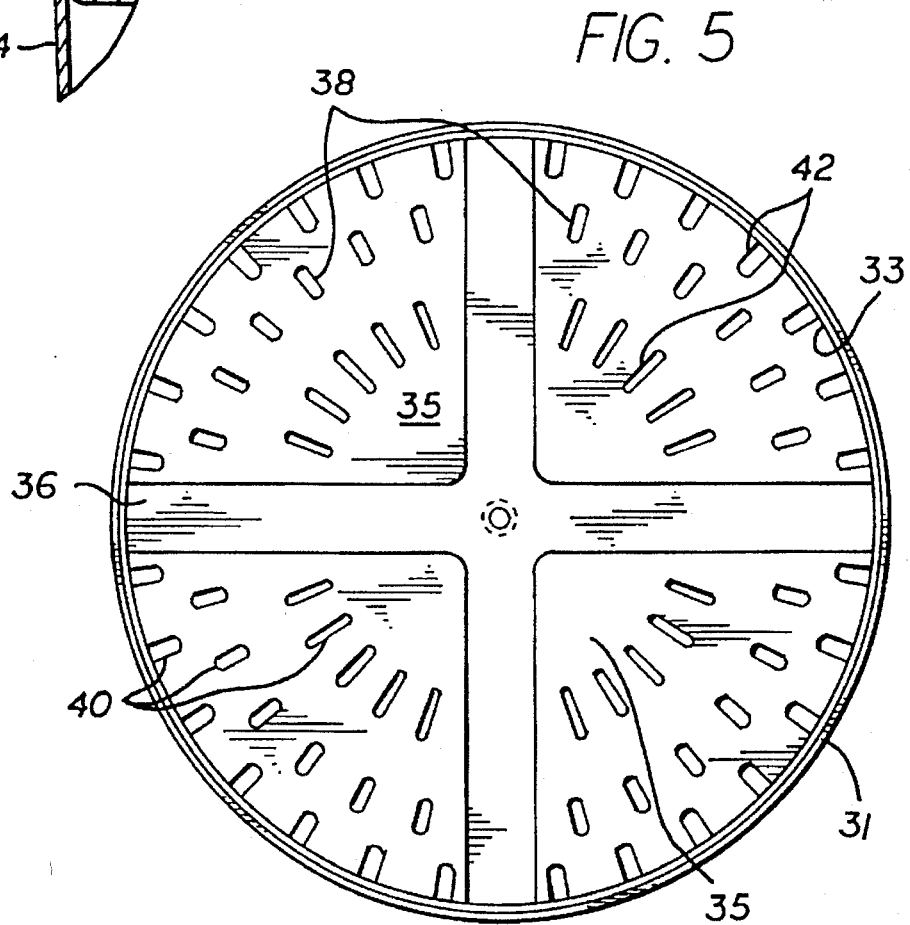
FIG. 5 is a plan view of the screen unit.

With reference to FIGS. 2, 3 and 4, the apparatus includes in addition to the receptacle 20 and drain unit 10, an oil filter support screen 31, which may take the form shown in the Figures, including an upstanding sidewall 33, and a transverse bottom wall 35 having cruciform bracing 36, and extensive perforate areas 38 which comprise segments of concentric rings 40 of radially disposed cuts 42. See FIG. 5. The depth of the support screen 30 is shallow and considerably less than the screen diameter. The sidewall 32 is slightly tapered inwardly from top to bottom so as to closely match the corresponding taper on the receptacle sidewall 24. This congruence of sidewalls 24, 32 about a common vertical axis shared by the receptacle 20 and screen support 40 enable the latter to wedge into the former for secure placement within the receptacle. This secure placement is ensured by positioning of the drain unit 10 as will be described below. See FIG. 3.

As best shown in FIGS. 2 and 3, the drain unit 10 is inverted over the receptacle 20 with the oil filter screen support 40 in place and the oil filter 18 ensconced on the screen support, as shown, or tumbled in with the pouring oil and subsequently righted with its opening down so as to continue draining. Once the oil and filter of an oil change are in the receptacle 20, the apparatus is sealed until it can be taken to a recycle location. The receptacle 20 and the drain unit 10 must both be sealed since both have been at least partly filled with oil. In the invention apparatus these components are used to seal each other. That is, the opening of one covers the opening of the other.

With reference to FIGS. 3 and 4 the drain unit 10 comprises a vertically extended sidewall 50, generally cylindrical, a transverse bottom (or top) wall 52, and an opening 54 circumscribed by inside flange 56. The drain unit sidewall 50 has a continued extent 58 beyond the inside flange 56 which also surrounds the drain unit opening 54. The height of the sidewall 50 including its continued extent 58 is low so as to permit locating the drain unit 10 under the motor vehicle as shown in FIG. 1, and typically is less than the diameter of the drain unit, in contrast to the receptacle 20 where the height is greater than the diameter.

The drain unit 10 has an outside flange 60 Which is U-shaped in cross section and integral with the drain unit sidewall 50 and open in the same direction as the drain unit opening 54. Flange 60 is located approximately opposite inside flange 56. Outside flange 60 is sized to overfit the receptacle perimetrical flange 34, and is provided with a circumferentially distributed series of inwardly disposed radially oriented tabs 62 at the lower edge margin 64 of the flange outer wall 66. The tabs 62 function like teeth to engage under the opposing edge 70 of receptacle perimetrical flange 34 when the drain unit 10 is pressed onto the receptacle 20 and the drain unit outer flange 60 overfits the perimetrical flange 34 of the receptacle and the tabs snap into place. See FIG. 4. The drain unit is not intended to be easily removable so as to minimize spillage, but it must be removed from time to time to use the apparatus. Accordingly, the outside flange 60 is provided with some flexibility by sections in areas adjacent the tabs 62 by cutting a series of kerfs 74 into flange outer wall 66 to enable flexing of the outer wall 66 by fingers inserted under the wall sufficiently to have the tabs 62 disengage from the edge 70 of the flange 34. The drain unit 10 is provided with sealant or an O-ring 80 at its seat with the receptacle 20 so as to ensure fluid-tight sealing.

Figure 6:
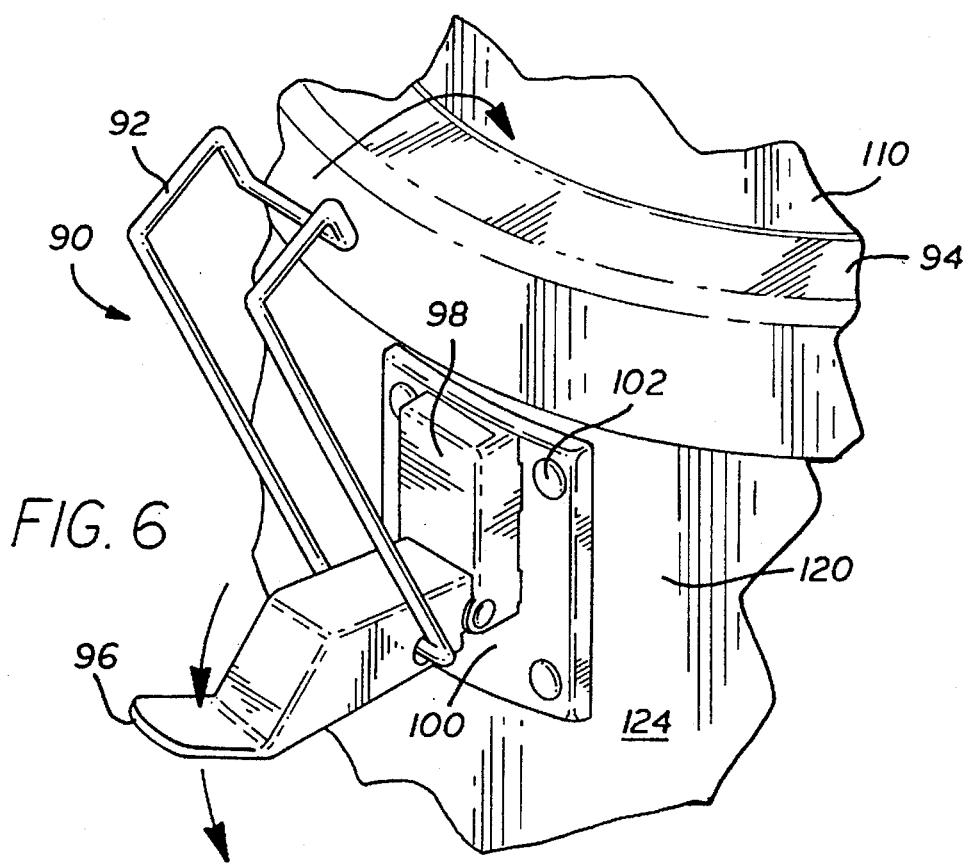
FIG. 6 is fragmentary view of the apparatus with an alternate form of locking.

With reference to FIG. 6, the fastening of the drain unit 110 to the receptacle 120 is effected by use of an overcenter clamp 90 having a clip 92 which engages the drain unit 110 at upper shoulder 94 and is drawn down by cam lever 96 which locks below the clamp base 98 secured to the receptacle sidewall 124 by plate 100 and rivets 102.

The invention thus provides an apparatus for the collection and recycle of both motor oil and oil filters from consumers in which the drain unit is low profile so as to fit under an automobile and upwardly open so as to receive draining oil. A higher profile receptacle receives the oil contents of the low profile drain unit and oil filter for temporary storage in a sealed condition against inadvertent loss of oil and for continued draining of the oil filter before ultimate disposal. Closing of the higher profile receptacle and the drain unit simultaneously is achieved by having the receptacle and drain unit registered with one another in opposed relation and fastened together in mutually sealed condition. The oil filter is suspended above the drained oil for continued draining of the filter during the interim between oil change and oil disposal, the oil filter typically being carried on a screen unit supported in fixed relation in the receptacle. The foregoing objects of the invention are thus met.

We claim:

1. An apparatus for collection of oil and oil filters for recycle, comprising a closed bottom receptacle having an outwardly tapered unitary wall defining an upward opening of a first, larger diameter, an oil filter support within and engaged by said receptacle unitary wall, and a drain unit having an outwardly tapered wall with a noncurved continued extent having an outermost edge defining an upward opening of a second, smaller diameter and an edge margin adjacent said outermost edge, said drain unit being adapted to collect oil under a motor vehicle in a collection position, said drain unit being bodily invertible to a draining position, said second, smaller diameter drain unit opening passing within and into said first, larger diameter receptacle unit opening to have said drain unit wall within and oppositely tapered relative to said receptacle wall, said drain unit wall continued extent edge being opposed to said oil filter support, said drain unit edge margin having an opposite taper to and being engaged with said receptacle tapered wall to transfer drained oil into and retain drained oil in said receptacle at the receptacle unitary wall engagement with said drain unit wall continued extent edge margin, said receptacle and drain unit having cooperating structure spaced from said drain unit opening and said oil filter support for securing said receptacle and said drain unit together in mutually closing relation against leakage of oil from the apparatus during temporary storage of the oil and oil filter therein and ultimate delivery therein of oil and oil filter content to a recycle location.

2. The apparatus according to claim 1, in which said receptacle is of greater vertical extent than said drain unit and not fittable under a motor vehicle like said drain unit.

3. The apparatus according to claim 1, in which said receptacle is of greater depth than diameter.

4. The apparatus according to claim 1, in which said drain unit is of greater diameter than depth.

5. The apparatus according to claim 1, including also a generally U-shaped in cross-section, axially open, perimetrical flange surrounding said receptacle opening, said receptacle flange defining the receptacle portion of said cooperating structure for securing said receptacle to said drain unit.

6. The apparatus according to claim 1, including also a generally U-shaped in cross-section, axially open, perimetrical flange extending about said drain unit, said drain unit flange defining the drain unit portion of said cooperating structure for securing said drain unit to said receptacle.

7. The apparatus according to claim 6, in which said receptacle includes a perimetrical flange, and said draining unit flange defines a circumferentially distributed series of radially disposed tabs, said tabs being adapted to interlock with said receptacle perimetrical flange in securing together said receptacle and said drain unit.

8. The apparatus according to claim 1, in which said drain unit wall continued extent edge blocks said oil filter support into a predetermined position in said receptacle out of contact with drained oil in said receptacle, said oil filter support lying within and surrounded by said receptacle unitary wall and below said drain unit in the inverted condition of said drain unit.

9. The apparatus according to claim 8, in which said oil filter support comprises a screen unit interfitted within said receptacle unitary wall in drain unit engaging relation, said screen unit defining a perforate wall in spaced relation to drained oil within said receptacle for supporting an oil filter in oil draining relation above said drained oil.

10. An apparatus for collection of oil and oil filters for recycle, comprising a receptacle having an upward opening of a given diameter and a depth greater than said given diameter, an oil filter support within said receptacle, said oil filter support having a vertical extent less than the depth of said receptacle, and above said oil filter support a drain unit having an opening smaller than and below said receptacle opening and a depth less than its diameter and sufficient to receive an oil filter standing on end on said oil filter support within said apparatus, said drain unit engaging said oil filter support to position said oil filter support within said receptacle, said drain unit being adapted to collect oil under a motor vehicle in a collection position in which said drain unit is upwardly open, said drain unit being bodily invertible from said collection position to be downwardly open to transfer drained oil into said receptacle, said receptacle and drain unit having mating structures for securing said receptacle and said drain unit together each mutually to close the opening in the other against oil leakage from the apparatus during temporary storage of the oil and oil filter therein and ultimate delivery therein of oil and oil filter content to a recycle location.

11. The apparatus according to claim 10, in which said receptacle and drain unit are fabricated of oil resistant plastic.

12. The apparatus according to claim 11, in which said receptacle comprises a vertically extended generally frusto-conical sidewall, a horizontal bottom wall at the lower end of said sidewall closing the lower end of said receptacle, and at the upper end of said sidewall an opening into said receptacle and a generally U-shaped in cross-section, downwardly open, perimetrical flange surrounding said receptacle opening, said receptacle flange defining said receptacle mating structure for securing said receptacle to said drain unit.

13. The apparatus according to claim 12, in which said drain unit comprises a vertically extended sidewall, a transverse bottom wall at one end closing said drain unit and an opening at the opposite end, and a generally U-shaped in cross-section perimetrical flange extending about said drain unit and open in the direction of said drain unit opening, said drain unit flange defining said drain unit mating structure for securing said drain unit to said receptacle.

14. The apparatus according to claim 13, in which said drain unit sidewall is inserted into said receptacle in the mated relation of said receptacle flange and said drain unit flange.

15. An apparatus for collection of oil and oil filters for recycle, comprising a receptacle having an upward opening of a given diameter and a depth greater than said given diameter, an oil filter support within said receptacle, said oil filter support having a vertical extent less than the depth of said receptacle, and above said oil filter support a drain unit having an opening smaller than and below said receptacle opening and a depth less than its diameter and sufficient to receive an oil filter standing on end on said oil filter support within said apparatus, said receptacle comprising a vertically extended generally frusto-conical sidewall, a horizontal bottom wall at the lower end of said sidewall closing the lower end of said receptacle, and at the upper end of said sidewall an opening into said receptacle and a generally U-shaped in cross-section, downwardly open, perimetrical flange surrounding said receptacle opening, said receptacle flange defining said receptacle mating structure for securing said receptacle to said drain unit, said drain unit comprising a vertically extended sidewall, a transverse bottom wall at one end closing said drain unit and an opening at the opposite end, and a generally U-shaped in cross-section perimetrical flange extending about said drain unit and open in the direction of said drain unit opening, said drain unit flange being inserted into said receptacle and defining drain unit mating structure for securing said drain unit to said receptacle, said drain unit being adapted to collect oil under a motor vehicle in a collection position in which said drain unit is upwardly open, said drain unit being bodily invertible from said collection position to be downwardly open to transfer drained oil into said receptacle, said receptacle and drain unit mating structures securing said receptacle and said drain unit together against oil leakage from the apparatus during temporary storage of the oil and oil filter therein and ultimate delivery therein of oil and oil filter content to a receptacle location, said oil filter support comprising a generally circular perforate wall transversely disposed within said receptacle in predetermined position to support an oil filter in draining position with said receptacle and said drain unit mated, said drain unit sidewall engaging said oil filter support to maintain said predetermined position of said support.

16. The apparatus according to claim 15, in which said drain unit sidewall defines a circular abutment, said abutment engaging said oil filter support adjacent said receptacle sidewall.

17. The apparatus according to claim 16, in which said drain unit flange defines a circumferentially distributed series of inwardly disposed radially oriented tabs adapted and arranged to lock with said receptacle perimetrical flange in securing together said receptacle and said drain unit.

18. The apparatus according to claim 17, in which said drain unit flange is locally flexible adjacent said tabs for separating said tabs from locking with said receptacle perimetrical flange.

19. The apparatus according to claim 18, in which said drain unit flange has a circumferential series of kerfs to provide local flexibility to said flange between said kerfs.

20. An apparatus for collection of oil and oil filters for recycle, comprising a receptacle having an upward opening of a given diameter and a depth greater than said given diameter, an oil filter support within said receptacle, said oil filter support having a vertical extent less than the depth of said receptacle, said oil filter support comprising a separately formed screen unit having a sidewall and perforate bottom wall, said screen unit sidewall being adapted to be wedged within said receptacle below the open end thereof with its bottom wall transverse to the longitudinal axis of said receptacle, and a drain unit having an opening of lesser diameter than said receptacle opening and a depth less than its diameter and sufficient to receive an oil filter standing on end supported by said oil filter support within said apparatus, said drain unit bring adapted to collect oil under a motor vehicle in a collection position in which said drain unit is upwardly open, said drain unit being bodily invertible from said collection position to be downwardly open to transfer drained oil into said receptacle, said drain unit extending above said receptacle opening a distance to accommodate height of an oil filter disposed on said screen unit and extending below said receptacle opening a distance to engage said screen unit in wedging relation against said receptacle in the mated condition of said drain unit with said receptacle, said receptacle and drain unit having mating structures for securing said receptacle and said drain unit together each mutually to close the opening in the other against oil leakage from the apparatus during temporary storage of the oil and oil filter therein and ultimate delivery therein of oil and oil filter content to a recycle location.

21. An apparatus for collection of oil and oil filters for recycle, comprising a generally frusto-conical receptacle having a bottom wall, a sidewall and an upward opening of a given diameter and a depth greater than said given diameter, a separately formed oil filter support screen wedged within said receptacle below the opening therein a predetermined distance and above said receptacle bottom wall a distance to keep an oil filter on said support screen above drained oil within said receptacle, a drain unit cooperating with the opening in said receptacle in closing relation, said drain unit having an opening of lesser diameter than said receptacle opening and a depth less than its diameter and sufficient to receive an oil filter standing on end supported by said oil filter support within said receptacle, said drain unit being adapted to collect oil under a motor vehicle in a collection position in which said drain unit is upwardly open, said drain unit being bodily invertible from said collection position to be downwardly open to transfer drained oil into said receptacle, said receptacle and drain unit having mating structures for securing said receptacle and said drain unit together each mutually to close the opening in the other against oil leakage from the apparatus, said mating structures including a perimetrical flange surrounding said receptacle opening, and interfittable therewith in locking relation a perimetrical flange extending about said drain unit intermediate the ends thereof, said drain unit engaging said support screen to secure said support screen in place when said drain unit is locked to said receptacle.

22. An apparatus for collection of oil and oil filters for recycle, comprising a receptacle having a tapered wall defining a receptacle upward opening of a given diameter, an oil filter support comprising a screen unit having a screen and a sidewall, and a drain unit having an oppositely tapered wall to said receptacle wall interfitting with said receptacle tapered wall in wedging relation to position said screen unit within said receptacle, said drain unit defining a drain unit upward opening receivable within said receptacle opening and adapted to collect oil under a motor vehicle in a collection position, said drain unit being bodily invertible to transfer drained oil into said receptacle in the received condition of said drain unit in said receptacle, said receptacle and drain unit having cooperating structure for securing said receptacle and said drain unit together in their said received condition in mutually closing relation against leakage of oil from the apparatus.

23. An apparatus for collection of motor vehicle oil and oil filters for recycle, comprising a receptacle, an oil filter support entirely within said receptacle, and a drain unit invertible between an oil collection position under a vehicle and an oil emptying position at least partially within said receptacle in lockable relation with said receptacle, said oil filter support and said drain unit being opposed in engaged relation within said receptacle in the locked condition of said receptacle and said drain unit.

24. Apparatus according to claim 23, in which said receptacle and drain unit have mating locating structures mutually to close each other against oil leakage from the apparatus.

25. A single transfer method of recycling oil and oil filters to a recycling center, including collecting vehicle oil and an oil filter from beneath the vehicle in a drain unit, inverting said drain unit in a receptacle receiving the opening of said drain unit and retaining said oil and oil filter separate with an oil filter support engaged within said receptacle by said drain unit, locking cooperating locating structure on said drain unit and said receptacle together against leakage, and transporting said same locked together drain unit and receptacle to a location for emptying and return and reuse.

* * * * *